an image

(12) United States Patent
Patino-Studencka et al.

(10) Patent No.: US 9,298,532 B2
(45) Date of Patent: Mar. 29, 2016

(54) DEVICE AND METHOD FOR DETERMINING A PHYSICAL QUANTITY

(71) Applicants: Fraunhofer-Gesellschaft zur Foerderung der angewandten Forschung e.V., Munich (DE); Friedrich-Alexander-Universitaet Erlangen-Nuernberg, Erlangen (DE)

(72) Inventors: Lucila Patino-Studencka, Nuremberg (DE); Joern Thielecke, Erlangen (DE)

(73) Assignees: Fraunhofer-Gesellschaft zur Foerderung der angewandten Forschung e.V., Munich (DE); Friedrich-Alexander-Universitaet Erlangen-Nuernberg, Erlangen (DE)

( * ) Notice: Subject to any disclaimer, the term of this patent is extended or adjusted under 35 U.S.C. 154(b) by 670 days.

(21) Appl. No.: 13/653,906

(22) Filed: Oct. 17, 2012

(65) Prior Publication Data

US 2013/0132784 A1    May 23, 2013

Related U.S. Application Data

(63) Continuation of application No. PCT/EP2011/056182, filed on Apr. 18, 2011.

(60) Provisional application No. 61/325,468, filed on Apr. 19, 2010.

(30) Foreign Application Priority Data

May 3, 2010    (DE) .......................... 10 2010 028 510

(51) Int. Cl.
  *G06F 11/00*    (2006.01)
  *G06F 11/07*    (2006.01)
  (Continued)

(52) U.S. Cl.
  CPC ................ *G06F 11/076* (2013.01); *G01D 3/08* (2013.01); *G01K 7/42* (2013.01); *G01K 15/007* (2013.01);
  (Continued)

(58) Field of Classification Search
None
See application file for complete search history.

(56) References Cited

U.S. PATENT DOCUMENTS 6,829,568 B2 *  12/2004  Julier et al. .................... 702/189
6,882,309 B2 *   4/2005  Bromley et al. .......... 342/357.64
(Continued)

OTHER PUBLICATIONS

Official Communication issued in corresponding International Patent Application No. PCT/EP2011/056182, mailed on Jul. 20, 2012.
(Continued)

*Primary Examiner* — Justin R Knapp
(74) *Attorney, Agent, or Firm* — Keating & Bennett, LLP

(57) ABSTRACT

In a method and a device for determining a physical quantity from a number of measured values containing errors, grouping of the number of measured values containing errors into a plurality of subgroups of measured values is executed, wherein each subgroup includes a redundancy, so that more measured values than the number of measured quantities are contained in each subgroup. Hereupon, a reliability quantity for each subgroup is calculated based on the redundancy contained in the subgroup. Further, individual evidence is allocated to the measured values containing errors of each subgroup based on the reliability quantity for the respective subgroups. An evidence determiner determines one overall evidence each for each measured value containing errors based on the individual evidence quantities for a respective measured value. Hereupon, a processor calculates the physical quantity using at least some of the measured values containing errors and at least some of the overall evidences.

18 Claims, 6 Drawing Sheets

(51) Int. Cl.
| | |
|---|---|
| G01K 7/42 | (2006.01) |
| G01K 15/00 | (2006.01) |
| G01S 5/02 | (2010.01) |
| G01S 19/20 | (2010.01) |
| G01S 19/42 | (2010.01) |
| G01D 3/08 | (2006.01) |
| G01S 19/23 | (2010.01) |
| G06F 17/18 | (2006.01) |
| G06K 9/00 | (2006.01) |

(52) U.S. Cl.
CPC .............. G01S 5/0278 (2013.01); G01S 19/20 (2013.01); G01S 19/23 (2013.01); G01S 19/42 (2013.01); G01S 19/425 (2013.01); G06F 17/18 (2013.01); G06K 9/00503 (2013.01)

(56) References Cited

U.S. PATENT DOCUMENTS

| | | | | |
|---|---|---|---|---|
| 8,135,505 | B2* | 3/2012 | Vengroff et al. | 701/24 |
| 8,717,234 | B2* | 5/2014 | Laine | 342/357.395 |
| 2009/0002234 | A1 | 1/2009 | Normark et al. | |
| 2009/0273511 | A1 | 11/2009 | Schroth | |
| 2010/0178934 | A1* | 7/2010 | Moeglein et al. | 455/456.1 |
| 2012/0127030 | A1* | 5/2012 | Arthur et al. | 342/357.28 |
| 2013/0162481 | A1* | 6/2013 | Parvizi et al. | 342/452 |

OTHER PUBLICATIONS

Desai et al., "A Fault Detection and Isolation Methodology," 20th IEEE Conference on Decision and Control Including the Symposium on Adaptive Processes, Dec. 16, 1981, pp. 1363-1369.
Perepectchai, "Global Positioning System Receiver Autonomous Integrity Monitoring," MSC Thesis, McGill University, Aug. 2000, 110 pages.
Broughton, "Evaluation of a New Satellite Navigation Integrity Monitoring Algorithm," MSC Thesis, McGill University, Sep. 2003, 276 pages.
Nikiforov et al., "GBAS with RAIM Based on the Constrained GLRT for Precision Landing Using Galileo and GPS," ION NIM 2007, Jan. 22-24, 2007, pp. 1234-1243, San Diego, CA.
Ober et al., "On the Use of Multiconstellation-RAIM for Aircraft Approaches," ION GNSS 19th International Technical Meeting of the Satellite Division, Sep. 26-29, 2006, pp. 2587-2596, Fort Worth, TX.
Ober, "Ways to Improve RAIM/AAIM Availability Using Position Domain Performance Computations," Proceedings of the National Technical Meeting of the Institute of Navigation, Jan. 16, 1997, 14 pages.

Van Graas et al., "Baseline Fault Detection and Exclusion Algorithm," Proceedings of the Institute of Navigation's Annual Meeting, Jun. 23, 1993, pp. 413-420.
Brown, "A Baseline GPS RAIM Scheme and a Note on the Equivalence of Three RAIM Methods," Navigation Journal of the Institute of Navigation, vol. 19, No. 3, Fall 1992, pp. 301-316.
Willsky, "A Survey of Design Methods for Failure Detection in Dynamic Systems," Automatica, Pergamon Press LTD, vol. 12, No. 6, Jan. 1, 1976, pp. 601-611.
Desai et al., "A Fault Detection and Isolation Methodology Theory and Application," American Control Conference, Jun. 6, 1984, pp. 262-270.
Patino-Studencka et al., "A Approach for Detection and Identification of Multiple Faults in Satellite Navigation," Position Location and Navigation Symposium, May 4, 2010, pp. 221-226.
Schroth et al., "Enhancements of the Range Consensus Algorithm (RANCO)," Proceedings of the ION GNSS Conference, 2008, 11 pages.
Kuusniemi, "User-Level Reliability and Quality Monitoring in Satellite-Based Personal Navigation," Ph.D. Dissertation, Tampere University of Technology, Jun. 11, 2005, 208 pages.
Pervan et al., "Parity Space Methods for Autonomous Fault Detection and Exclusion Using GPS Carrier Phase," IEEE 1996 Position Location and Navigation Symposium, 1996, pp. 649-656.
Lee, "Receiver Autonomous Integrity Monitoring (RAIM) Capability for Sole-Means GPS Navigation in the Oceanic Phase of Flight," IEEE Aerospace and Electronic Systems Magazine, vol. 7, No. 5, 1992, pp. 464-472.
Nikiforov et al., "Statistical Analysis of Different RAIM Schemes," ION GPS 2002: 15th International Technical Meeting of the Satellite Division of The Institute of Navigation, Sep. 24-27, 2002, pp. 1881-1892.
Kaplan et al., Understanding GPS: Principles and Applications Second Edition, C. J. H. Elliott Kaplan, Ed. Artech House, 2006, 7 pages.
Kay, Fundamentals of Statistical Signal Processing: Detection Theory. Prentice Hall, Upper Saddle River, New Jersey.
Gibbons et al., "P-Values: Interpretation and Methodology," The American Statistician, vol. 29, No. 1, Feb. 1975, pp. 20-25.
Elston, "On Fisher's Method of Combining p-Values," Biometrical Journal, vol. 33, No. 3, 1991, pp. 339-345.
Hubbard et al., "Confusion Over Measures of Evidence (p's) Versus Errors ($\alpha$'s) in Classical Statistical Testing," The American Statistician, vol. 57, No. 3, Aug. 2003, pp. 171-178.
Schroth et al., Failure Detection and Exclusion via Range Consensus European Navigation Conference.
Deangelis, "A Thresholdless Redundancy Management Algorithm for Skewed Sensor Arrays", Proceedings of the 9th IEEE/AIAA/NASA Digital Avionics Systems Conference,1990, pp. 133-140.

\* cited by examiner $$y = Hx + w \qquad \text{H: measurement matrix}$$

FIGURE 3A $$Si = S_1, S_2, S_3 \ldots S_{n!/(n-k)!k!} \qquad \text{Si: redundant subgroups}$$

FIGURE 3B $S_1 = \{1\ 2\ 3\}$
$S_2 = \{1\ 2\ 4\}$
$S_3 = \{1\ 3\ 4\}$
$S_4 = \{2\ 3\ 4\}$ for regression:
2 unknowns
(inclination; y-section)

1 redundancy

| Set \ measurement | 1 | 2 | 3 | 4 |
|---|---|---|---|---|
| $S_1$ | 0.5 | 0.5 | 0.5 | 0 |
| $S_2$ | 0.1 | 0.1 | 0 | 0.1 |
| $S_3$ | 0.06 | 0 | 0.06 | 0.06 |
| $S_4$ | 0 | 0.01 | 0.01 | 0.01 |

DEVICE AND METHOD FOR DETERMINING A PHYSICAL QUANTITY

CROSS-REFERENCE TO RELATED APPLICATIONS

This application is a continuation of copending International Application No. PCT/EP2011/056182, filed Apr. 18, 2011, which is incorporated herein by reference in its entirety, and additionally claims priority from U.S. Application No. 61/325,468, filed Apr. 19, 2010, and German Application 10 2010 028 510.2, filed May 3, 2010, which are all incorporated herein by reference in their entirety.

BACKGROUND OF THE INVENTION

The present invention relates to devices and methods for error detection and error isolation in redundant physical systems and in particular to devices and methods for determining a physical quantity from a number of measured values containing errors, wherein the physical quantity is defined by a measured quantity or a plurality of measured quantities, and wherein the number of measurements is higher than the number of (unknown) measured quantities.

For the identification of individual errors, a comparison of a so-called parity vector to the characteristic error lines (bias lines or "failure-direction-lines") is executed for each satellite [3], [4], [5]. With simultaneously occurring multiple errors, in the previous years different algorithms were used. Mainly, they are based on subset checks. One of these algorithms is the RANCO algorithm [11]. RANCO is based on the so-called RANSAC algorithm, which is common in robotics. From a minimum number of measurements, i.e. from a number of measurements which is as small as possible, the same calculates a number of possible solutions in order to generate the model. From each of those solutions, the difference between the actual model and all remaining measurements is calculated. The result is compared to a fixed threshold value. In this form, so-called inliers and outliers are determined. From the set having the greatest number of inliers, the model is newly calculated, i.e. the residual measurements (outliers) are evaluated to be erroneous and ignored. A threshold value to execute this decision is here selected empirically.

Determining a physical quantity from measured values containing errors may, however, not only be executed for the satellite navigation, but in all fields of physics, i.e. for position determination, determining a distance, a pressure, a temperature, a speed, an acceleration, an area, a volume, an electrical quantity, a magnetic quantity, an optical quantity or a hydraulic quantity, as far as measurements are executed in this respect which may be erroneous which will be the case with typical measurements.

With such applications, it is often an objective to estimate physical quantities from the measurements. Apart from this, a linear model exists representing the connection between measurements and physical quantities. Thus, for example, with a regression line, the position of the regression line is to be estimated. Its inclination and/or its Y-Section then represent the requested physical magnitude. The regression line may here be executed by measurements of different points, which all ought to be located on the line, wherein measurement errors may be considerable, wherein the measurement errors are on one hand typical noise and on the other hand, a typical constant error, which is also referred to as offset.

Long since, however, in the field of satellite navigation, the evaluation of redundant measured values containing errors has gained more and more importance. Position determination with satellite navigation systems is based on pseudo-distance measurements (pseudo-range measurements) and phase measurements. These measurements are frequently affected by certain phenomena like reflection and diffraction which may not be detected or corrected during the signal processing steps executed before position determination. Such interferences result in measurement errors also referred to as "bias" associated with the measurements. With the introduction of new global navigation satellite systems like Galileo it may be expected that on average 18 satellites are in the field of view and that a minimum of 13 satellites are in the field of view. This not only leads to a higher redundancy for position determination, but also to more possible error sources. Thus, in particular with such a proceeding, the assumption of one single erroneous signal is no longer valid.

The first objective of so-called error detection and identification technologies (FDI technologies) is the detection, i.e. to determine whether at least one erroneous measurement exists. This is treated as a hypothesis test problem. The null hypothesis ($H_0$) corresponds to the case that no error is present, while the alternative hypothesis ($H_1$) corresponds to the erroneous case. In the past years, some approaches were represented under the headword RAIM, as they are described in [2]. The identification of individual errors is achieved by comparing a parity vector to the characteristic bias-line of each satellite, as it is described in [3], [4] and [5]. The identification of several errors may be executed by testing measurement subgroups as it is described in [1].

It is, in particular, disadvantageous with regard to this conventional technology, that the threshold value has to be determined empirically and that a hard decision has to be executed between erroneous measurement and non-erroneous measurement, i.e. that the "good rest" of an erroneous measurement is also discarded or that when an erroneous measurement is not eliminated, an unnecessitated error is introduced as this measurement is used for determining the physical quantity.

SUMMARY

According to an embodiment, a device for determining a physical quantity from a number of measured values containing errors, wherein the physical quantity is defined by a measured quantity or a plurality of measured quantities, and wherein the number of the measured values is higher than the number of the measured quantities, may have: a grouping means for grouping the number of measured values containing errors into a plurality of subgroups of measured values, wherein each subgroup includes a redundancy, so that more measured values than the number of measured quantities of each subgroup are contained; a calculator for calculating a reliability quantity for each subgroup based on the redundancy contained in the subgroup; an individual allocator for allocating an individual evidence quantity to the measured values containing errors of each subgroup based on the reliability quantity for the respective subgroups; an evidence determiner for determining one overall evidence each for the measured values containing errors based on the individual evidence quantities for a respective measured value; and a processor for calculating the physical quantity using at least some of the measured values containing errors and at least some of the overall evidences.

According to another embodiment, a method for determining a physical quantity from a plurality of measured values containing errors, wherein the physical quantity is defined by a measured quantity or a plurality of measured quantities, and wherein the number of measured values is higher than the number of measured quantities, may have the steps of: grouping the number of measured values containing errors into a plurality of subgroups of measured values, wherein each subgroup includes a redundancy, so that more measured values than the number of measured quantities of each subgroup are contained; calculating a reliability quantity for each subgroup based on the redundancy contained in the subgroup; allocating an individual evidence quantity to the measured values containing errors of each subgroup based on the reliability quantity for the respective subgroup; determining one overall evidence each for the measured values containing errors based on the individual evidence quantities for one respective measured value; and calculating the physical quantity using at least some of the measured values containing errors and at least some of the overall evidences.

Another embodiment may have a computer program for executing the inventive method for determining a physical quantity from a number of measured values containing errors, when the method is executed on a computer.

The present invention is based on the finding that the redundancy occurring with measurements where more measured values are taken than (unknown) measurement quantities exist, may be used advantageously to determine an overall evidence for each measured value on the basis of which the corruption or correctness of this measured value may be estimated to exclude this measured value from the measurement when it falls below a certain overall evidence or to accordingly weight this measured value according to its overall evidence.

As each measured value per se does not allow a statement as to whether it has evidence, i.e. conclusiveness or not, i.e. whether it is interfered with or not, and as this statement may only be made based on an existing redundancy, according to the invention redundant subgroups of measured values are formed. The subgroups of measured values are so that at least more individual measurements exist in a subgroup than physical quantities or measured quantities are to be determined. If two measured quantities are to be determined, as, for example with the regression line, i.e. the inclination and the y-section, then the subgroups will each have at least three measurements, i.e. one redundant measurement. Due to this redundancy, according to the invention, then for each subgroup a reliability quantity is calculated which indicates how reliable this subgroup is for the final result. If a subgroup has few erroneous measured values, it will receive a high reliability measure, while when a subgroup has several erroneous measured values, this subgroup will receive a low reliability measure. It is here advantageous, however, that this reliability quantity does not have to be determined individually for each measured value, but is determined for a redundant subgroup each. Based on the reliability quantities for each subgroup, according to the invention, then an allocation of an evidence quantity to each erroneous measured value of each subgroup is executed based on the reliability quantity for the respective subgroup. Advantageously, the reliability quantity for a subgroup is taken as an evidence quantity for each individual measured value. Each measured value thus receives the same evidence quantity which is equal to the reliability quantity for the overall subgroup. Alternatively, however, also an allocation of different evidence quantities to the measured values containing errors of each subgroup may be executed which are, for example, selected so that the average value from the allocated evidence quantities is equal to the reliability quantity for this subgroup or is apart from this reliability quantity only less than a threshold, wherein this threshold is for example 50% or even less than 20% with respect to the value of the reliability quantity in the positive and negative direction.

A further advantage is that in contrast to conventional algorithms no decision (erroneous or error-free) has to be taken here, so that a loss of information here is prevented.

It was thus achieved according to the invention that each measured value now has several evidence quantities as each measured value occurred in different redundant subgroups. By the evidence determiner, the individual evidence quantities for the measured values are put together into an overall evidence such that in the end each individual measured value has one individual evidence, i.e. the overall evidence. This may, for example, be executed by adding up, by selecting the largest or second largest value, by averaging or in any other way, in which the individual evidence quantities may be evaluated for one and the same measured value containing errors obtained from the different redundant subgroups, or be combined with each other.

The overall evidence for a measured value now indicates a measure for reliability with which this measured value is a correct or error-free measured value or not. On the basis of the overall evidence values for the individual measured values then a processor may calculate the physical quantity. Depending on the implementation, the overall evidence values may be taken as weightings in a statistical calculation of a physical quantity, for example using the WLS algorithm (Weighted Least Squares). Here, however, any proceeding may be used to calculate a physical quantity on the basis of redundant measurements and weighting factors associated with the measurements, as they are, for example also known from the field of maximum likelihood estimation or maximum likelihood sequence estimation. Alternatively or additionally, also measured values whose overall evidence does not fulfill certain preconditions, whose overall evidence is, for example, so small that the evidence of this measured value is questionable for a reason, are excluded from measurement. In this respect, an empirical threshold may be provided or a so to speak variable threshold may be taken such that a certain percentage of measured values which have the smallest overall evidences are excluded. Thus, for example, an evaluation without thresholds might also be executed insofar as, for example, the two measured values having the smallest evidence are excluded from measurement independent of how small the overall evidence actually is. The number of measured values excluded from measurement may be set depending on the existing redundancy, i.e. on the ratio of the number of measured values containing errors to the number of measured quantities.

BRIEF DESCRIPTION OF THE DRAWINGS

Embodiments of the present invention will be detailed subsequently referring to the appended drawings, in which:

FIGS. 3a-f show a first example for implementing the inventive concept according to one embodiment;

DETAILED DESCRIPTION OF THE INVENTION

Figure 1:
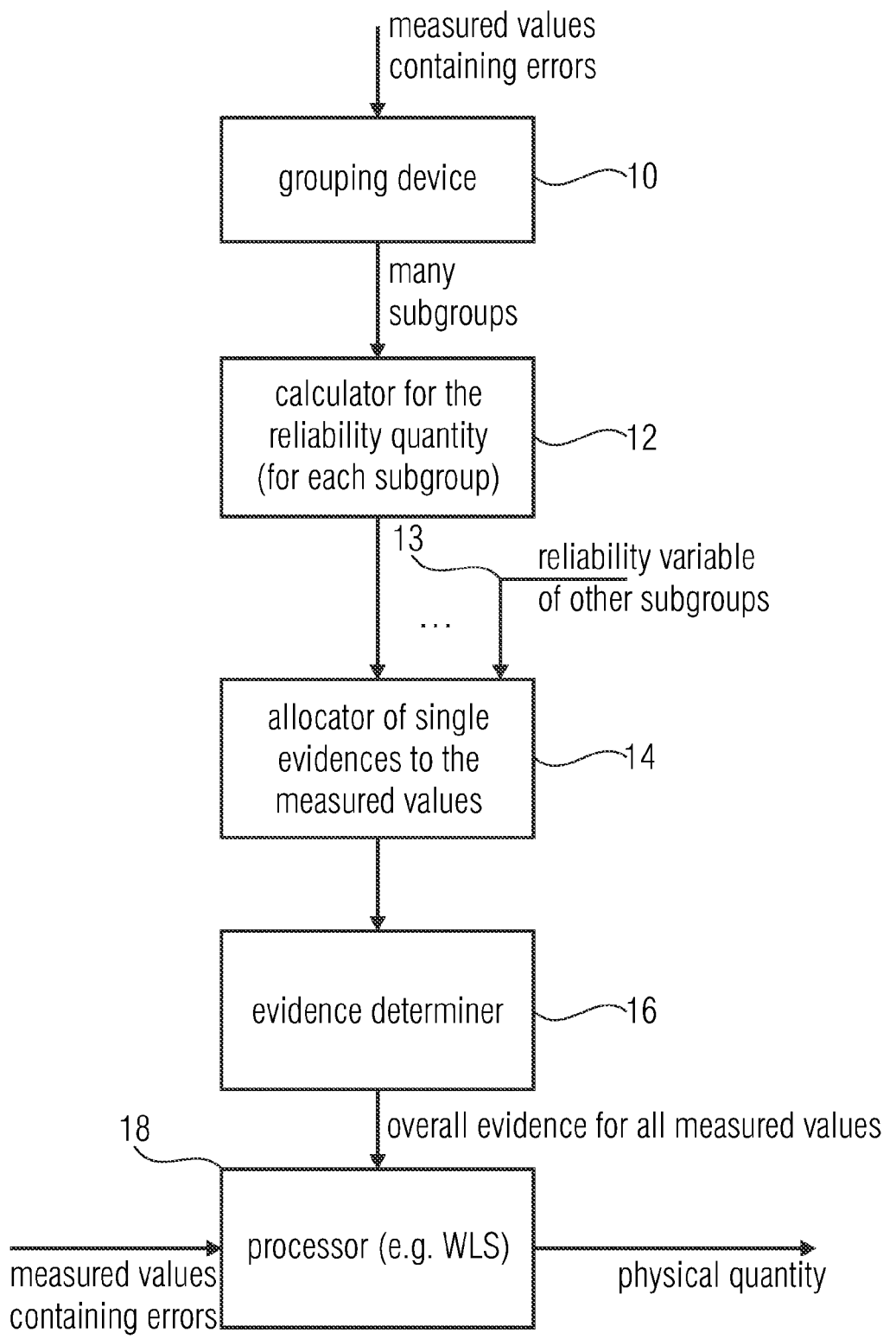
FIG. 1 shows a block diagram of an inventive device or an inventive method for determining a physical quantity from a number of erroneous measured values.

Error detection and identification technologies (FDI technologies) detect erroneous or corrupt navigation satellite signals using redundancy provided by the measurement of several satellite signals. The plurality of the FDI approaches only assume one erroneous measured value. This assumption is no longer valid, however, when the number of satellite signals increases as it may be expected with an increasing use of new satellite systems. According to the invention, an FDI approach is provided for the identification of several simultaneous errors, which provides quality values for each measurement, i.e. based on statistical concepts like a test statistics and a monitored significance level. In particular, for each subgroup, a reliability quantity or characteristic is calculated which is then used to allocate an evidence characteristic to each measured value containing errors so that each measured value containing errors has several evidence characteristics which are then used to determine an overall evidence for each measured value containing errors.

In one embodiment of the present invention, a test statistics is determined which considers that the noise which may interfere with each measurement may be different, i.e. have different variances. By an algorithm according to the invention, then several simultaneous errors may be identified and error identification may be used to determine the physical quantity, which is in the satellite navigation example the position, for example, on earth, derived from the so-called pseudo-ranges, i.e. the distances between the position and different satellites which may be received or are "visible" from this position. The calculation of a position based on satellites or on signals of navigation satellites is described in [7].

In the following, a mathematical formulation of the position determination process is illustrated which uses the relation between the least-squares-residual-vector and the parity vector. From this, depending on the measurement noise a Rao test statistics is derived and a significance level is represented. Based on these concepts, an FDI approach is represented.

In the following, reference is made to position determination and parity space. The position calculation in satellite navigation systems is based on a linearized measurement equation given as follows:

$$Y = Hx + e \tag{1}$$

In equation 1, y is the vector of the measured residual values calculated as the difference between the measured and the predicted pseudo-ranges. For N observed satellites, y has the dimension N×1. H is the output matrix (monitoring matrix) or matrix with the dimension N×4. x is a vector of the dimension 4×1, which has the user position and the timing error (clock error) with respect to the linearization point. e is the error in the measurements (N×1), consisting of noise and bias.

As the state vector x has four unknown variables, at least four measurements are necessitated to obtain a solution. All other N−4 measurements provide a redundancy in the solution and may be used to improve the so-called dilution of precision (DOP).

The optimum solution of [1] is obtained by the weighted-least-squares-method (WLS):

$$\hat{x} = (H^T W^{-1} H)^{-1} H^T W^{-1} y \tag{2}$$

$W^{-1}$ is a weighting matrix related to the relative noise level and whose weighting values are given by the overall evidences for each measured value or may be set according to the invention. Typically, W is a diagonal matrix having the effective values or variances of noise as diagonal elements which, according to the invention, still have to be weighted with the respective overall evidences for the corresponding measured values. The number of diagonal elements of W is equal to the number of measured values containing errors, so that each overall evidence value is weighted with the effective value of noise ($\sigma$), associated with a measured value.

When more than four measurements exist, the matrix H not only contains the information necessitated for position calculation (geometry information), but additional redundancy information. A separation of the geometric information and the redundancy in the measurements may be executed by transforming equation (1) from the position space into the parity space by parity matrix P. This may, for example, be executed y a QR factorization of the matrix H.

$$Q^T y = Rx + Q^T e \tag{3}$$

$$\begin{bmatrix} Q_1 \\ P \end{bmatrix} y = \begin{bmatrix} R_1 \\ 0 \end{bmatrix} x + \begin{bmatrix} Q_1 \\ P \end{bmatrix} e \tag{4}$$

$Q_1$ and P are the top and bottom submatrices of $Q^T$ and $R_1$ is the top matrix of R. The lines of P are orthogonal to each other, have the amount of 1 and are each orthogonal to the columns of H. The corresponding parity vector p is given by equation (5), as illustrated in [6].

$$p = Py = Pe \tag{5}$$

The parity vector contains no geometrical information but only information on the Bias and the noise existing in the measurements. The same is a linear combination of these contributions. If it is assumed that the measurement residual values for the satellite navigation are Gaussian random variables, the resulting parity vector is also a Gaussian vector.

As the covariance matrix C of the measurements is assumed to be given, the covariance of p may be calculated. In case of error free measurements, the mean value of p is equal to 0. Otherwise, it is a linear combination of the measurement Bias vector b and is thus unknown.

$$e \sim N(b, C) \tag{6}$$

$$p \sim N(Pb, PCP^T) \tag{7}$$

Thus, the probability density function (PDF) of the parity vector is given as follows:

$$f_p(p) = \frac{1}{(2\pi)^{\frac{N}{2}} |PCP^T|} \exp{\frac{1}{2}(p-Pb)^T (PCP^T)^{-1}(p-Pb)} \tag{8}$$

In the following, the statistical background is discussed in more detail. First of all, test statistics are explained. As each measurement may only have one of two possible states, i.e., wrong or error free, it is possible to define two hypotheses for the parity vector. All measurements are error free $H_0$ or at least one measurement is erroneous $H_1$.

$$H_0 : b = 0$$

$$H_1 : b \neq 0 \tag{9}$$

For this hypothesis test the PDFs of $H_0$ and $H_1$ are identical with the exception of the value of the unknown parameter vector b.

If the PDFs of both $H_0$ and $H_1$ are completely known, it is possible to develop optimum detectors.

If the PDFs have certain unknown parameters, the same have to be accommodated in the common hypothesis test. The Bayes approach models the unknown parameters as the realization of a vector random variable which is connected to these former PDFs. This approach is described in [3]. Setting the former probability models for biases for individual and several errors is extensive, however. The generalized likelihood ratio test (GLRT) replaces the unknown parameters by their maximum likelihood estimates (MLE) as illustrated in [5]. The Rao test is asymptotically equivalent to the GLRT and is advantageous to calculate the test statistics of the hypothesis model, which is described in [9]. The main advantage of this test is that it only necessitates assumptions regarding the null hypothesis $H_0$ which is completely known and necessitates no MLE evaluation under $H_1$.

The Rao test has the following form, as it is described in [7]:

$$T_R(p) = \frac{\partial \ln f_p(p;b)}{\partial b}\bigg|^T_{b=0} I^{-1}(b=0) \frac{\partial \ln f_p(p;b)}{\partial b}\bigg|_{b=0} \quad (10)$$

wherein I is the Fisher information matrix and wherein $f_p(p)$ is given by (8). The Rao test of (10) applied for parity vector p results in:

$$T_R(p) = p^T(PCP^T)^{-1}p \quad (11)$$

These test statistics may be used to test the current measurement sets when the measurements have different noise levels as it is the case in case of combined GPS and Galileo measurements. Information on the variants of the measurements and their correlations are contained in C. When all measurements are uncorrelated and have the same standard deviation σ, the covariance matrix C obtains the following form:

$$C = \sigma^2 I \quad (12)$$

Here, $PP^T = I$. The test statistics leads to the traditional chi square test statistics used by GPS-RAIM, as described in [6].

$$T_R(p) = \left|\frac{p}{\sigma}\right|^2 \quad (13)$$

For the null hypothesis, the Rao test leads to a centralized chi-square distribution with N−4 degrees of freedom. For the alternative hypothesis $H_1$, this results in a non-centralized distribution with the non-centrality parameter λ which depends on the Bias b.

$$T_R(p) \sim \begin{cases} \chi^2_{N-4} & \text{under } H_0 \\ \chi^2_{N-4}(\lambda) & \text{under } H_1 \end{cases} \quad (14)$$

Test statistics [11] consider that the standard deviation of noise affecting each measurement may be different. Thus, it may be used in RAIM algorithms relating to many navigation systems with different noise variants. The test statistics is able to evaluate the complete measurement set but not individual measurements.

In the following, reference is made to the significance level. Apart from test statistics, there is a further important statistical concept in the observed significance level or p value (m). For a given observation $p_0$, the significance level of p is defined as follows:

$$m(p) = F_0(T_R(p) \geq T_R(p_0)) \quad (15)$$

Here, $F_0$ is the probability under the null hypothesis.

The p value (m) is defined as the probability that the result of an experiment under the null hypothesis is equal to the monitored value or exceeds this monitored value. The same may be interpreted as a measurement of the extent to which the observation supports the null hypothesis in one single experiment or is objected to the same, as it is illustrated in [8]. A smaller value of m shows a high evidence against the null hypothesis.

The observed significant level may only take values between 0 and 1. If the null hypothesis is true, n may be regarded as the realization of a random variable which is equally distributed in the interval in [0, 1] as illustrated in [9].

In the following, reference is made to the inventive concept with reference to FIGS. 1 to 6.

FIG. 1 shows a block diagram of an inventive device or a flow chart of an inventive method for determining a physical quantity from a number of measurement values containing errors, wherein the physical quantity is defined by a measured quantity or a plurality of measured quantities, and wherein the number of measured values is higher than the number of measured quantities and/or unknown quantities. The device includes a grouping means 10 for grouping the plurality of measured values containing errors into a plurality of subgroups of measured values, wherein each subgroup comprises a redundancy so that more measured values than the number of measured quantities exist in each subgroup.

The grouping means 10 thus contains input values, the different measured values, and provides a number of subgroups at the output side, wherein each subgroup includes a redundancy, i.e., at least one more measured value than there are (unknown) measured quantities to be determined. The grouping means 10 is coupled to a calculator 12 for calculating a reliability variable for each subgroup based on the redundancy contained in the subgroup. Thus, as illustrated by an arrow 13, for each subgroup an individual reliability variable is calculated and all reliability quantities for all subgroups are fed into an allocator 14 coupled to the calculator 12. The allocator is implemented to allocate individual evidence quantities to the measured values of each subgroup containing errors based on the reliability quantities for the respective subgroups. Advantageously, the allocation consists in allocating to each measured value of each subgroup the reliability value which was calculated for the subgroup. Also different individual evidence quantities may be allocated to the individual measured values which are derived, however, from the reliability quantity for the respective subgroup. Such a derivation may, for example, be that the individual evidence quantities are calculated so that the average value is equal to the reliability quantity for the subgroup.

An evidence determination means 16 is coupled to the allocator 14 which is implemented to determine an overall evidence for each measured value containing errors based on the individual evidence quantities for the respective measured value. This may be done, for example, by the addition of the individual evidence quantities which were allocated to the measured values based on the fact that each measured value "occurred" in several subgroups. Alternatively, for each measured value an average value of the individual evidence quantities may also be taken or e.g., the highest or second highest individual evidence value may be allocated or a similar type of combination of the individual evidences or the selection of an individual evidence may be executed according to a certain criterion.

The evidence determination means or determiner 16 is coupled to a processor 18 for calculating the physical quantity, wherein the physical quantity is calculated using at least some of the measured values containing errors and at least some of the these overall evidences. The processor is implemented, depending on the implementation, to use the overall evidences for the measured values as weightings for the measured values in a WLS method or a similar method. Alternatively, the processor may be implemented to exclude certain measured values with individual evidences which are smaller than a certain threshold from the measurement so that the physical quantity is executed using the still remaining measured values, wherein the remaining measured values may be weighted or non-weighted. Due to the fact that an exclusion of measured values for the calculation by the processor may be executed depending on a threshold or randomly in this respect so that at least so many measured values remain as there are measured quantities, the inventive concept may not only identify one single error but several errors simultaneously.

Figure 2:
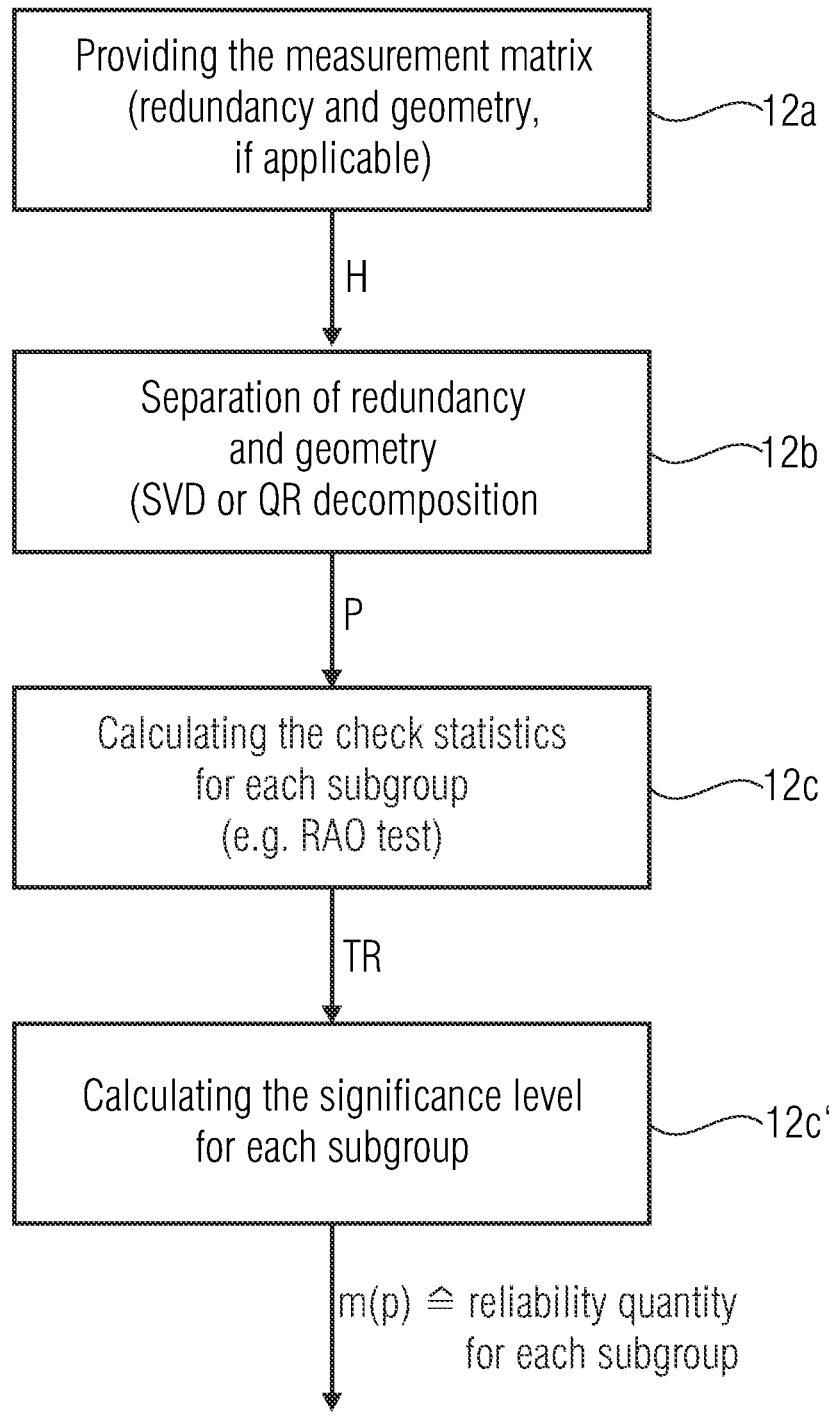
FIG. 2 shows an implementation of the calculator for calculating a reliability quantity for each subgroup based on the redundancy contained in the subgroup.

FIG. 2 shows an implementation of the calculator 12 to calculate as a reliability quantity for each subgroup a significant level m(p) according to equation (15). For this purpose, the calculator 12 is implemented to provide first of all a measurement matrix H as illustrated at 12a. The measurement matrix H is a matrix which represents the connection between the measured values containing errors on the one hand and the measured quantities on the other hand. Typically, the measured matrix includes both redundancy information and also geometry information. If the measurement matrix includes redundancy information and geometry information, in a step 12b a separation of the redundancy from the geometry is executed as it was represented with reference to equation (3). Advantageously, here an SVD or a QR factorization of the measurement matrix H was executed to calculate the parity information and, in particular, the parity matrix P. However, if the measurement matrix or the problems to be solved is such that only redundancy information and no geometry information is contained, as it would, for example, be the case if a horizontal line were the solution of a regression problem, then step 12b is not necessitated. If the line is a line with an inclination, however, as illustrated, for example with reference to FIG. 4a, then the transformation in step 12b causes a rotation of the line into the horizontal position.

Using satellite navigation as an example, in the measurement matrix the positions of the satellites are contained, which represent geometry information, so that here the measurement matrix H which links the error values (residuals) of the pseudo range determination to the position which is searched, includes geometry information, so that in the application of the present invention for the satellite navigation a separation of redundancy and geometry according to step 12b is necessitated.

In a step 12c, on the basis of the parity information P, a calculation of the test statistics for each subgroup, e.g., using the Rao test is executed as illustrated in 12c. The result of the Rao test is a test statistic $T_R$ for each subgroup as represented in equation (11) to equation (13). Using the test statistics for each subgroup finally in a step 12c for each subgroup the significance level may be calculated by using the so-called "right tail probability" of the distribution illustrated in FIG. 6b, by integrating the illustrated PDF curve up to positive infinity based on the determined value $T_R$ which was calculated for a subgroup. Depending on whether the $T_R$ value is closer to zero or further away from zero, the reliability quantity m(p) or the significance level according to equation (15) is higher or lower. If a value $T_R$ is relatively high for a subgroup, the significance level will be relatively low and vice versa.

Although above, with reference to FIG. 2, a special implementation was illustrated for calculating the reliability quantity, also alternative statistical calculations may be used for reliability quantities for each subgroup, wherein the reliability quantities are estimated beforehand or alternatively depending on the implementation.

FIGS. 3a to 3f disclose an alternative implementation or an alternative example of the present invention, wherein by the inventive concept a quality value is allocated to each measurement, i.e. the overall evidence, and wherein this quality value may be integrated into a solution as a weight, either for excluding a measured value or for weighting a measured value. The quality value is calculated from the statistical characteristics of the error of the measurement and its compliance with the residual measurements.

First of all a linearization is executed if the system is present in a non-linearized form in order to obtain a linear definition equation, as illustrated in FIG. 3a. Then the system is present in the form illustrated in FIG. 3a, wherein y are the measurements, wherein H is the measurement matrix, wherein x is the searched model (the searched states) and wherein w represents the measurement noise. If the relation between measurements and model is non-linear, as is the case in satellite navigation between pseudo ranges and positions, a linearization is executed.

Hereupon, the measuring point set N is divided into subsets of at least k+1 (elements), i.e., into the subgroups, wherein k is the minimum number of necessitated measurements for solving the linear problem. In this form, a minimum redundancy is guaranteed. Depending on the number of elements L subsets result L=N!/((N−z)!z!). The subgroup as illustrated in FIG. 3b as $S_i$ is then analyzed. If, for example, four measurements exist and the system contains two states, subsets having three elements are to be formed as illustrated in FIG. 3c.

Hereupon, a matrix P orthogonal to the measurement matrix H in FIG. 3a is calculated, for example by means of a SVD or QR factorization or decomposition, so that the information regarding geometry and redundancy are separated.

Subsequently, a test statistic is calculated for each subgroup. The way how the test statistics or check quantity is calculated varies from application to application depending on what distribution is assumed. Subsequently, the observed significance level is calculated for each subgroup or subgroup. The observed significance level is taken as an evidence for an error free subgroup. This significance level corresponds to the reliability value associated with each subgroup.

Now, this reliability value is allocated to each measurement in a subgroup. To measurements which do not exist in the subgroup here a fixed value is allocated such as, for example 0. As an example, in FIG. 3d certain reliability values $E_v$ are allocated to the individual subgroups. FIG. 3e then shows the division or allocation to the individual measured value as it would be executed by the allocator 14. The evidence determination means would then calculate the overall evidences $M_i$ for the individual measured values using the data in FIG. 3e.

In the example illustrated in FIG. 3f, an addition of the individual evidence quantities is executed as illustrated in FIG. 3d and presented in tabular form in FIG. 3e. Alternative evidence determinations may, however, also be executed. Thus, for example, from each column of the table in FIG. 3d the maximum may be selected which would lead to the fact that the "bad" measured value 4 would receive a clearly changed value than the other three "good" measured values. An addition or an averaging provides, however, a more differentiated result if, for example, more than one measured value ought to be excluded.

The overall evidence illustrated in FIG. 3f may then be taken as weighting factors according to equation (2) i.e., as diagonal elements of the matrix W, wherein depending on the implementation a weighting with the variances $\sigma^2$ of the noise which is allocated to the respective measured values which may be different from satellite to satellite and thus from measured value to measured value would still have to be executed.

According to the invention, thus large outliers may be sorted out by means of a threshold value applied to the overall evidences, which would mean, for example, in FIG. 3e that the measured value 4 would be sorted out if the threshold was, for example, 0.4 or 0.5. Alternatively, however, also an operation without a threshold is possible when, for example, depending on the requirement, those two or three values are sorted out, i.e. not used for calculation by the processor, which have the worst overall evidences.

Figures 4A, 4B:
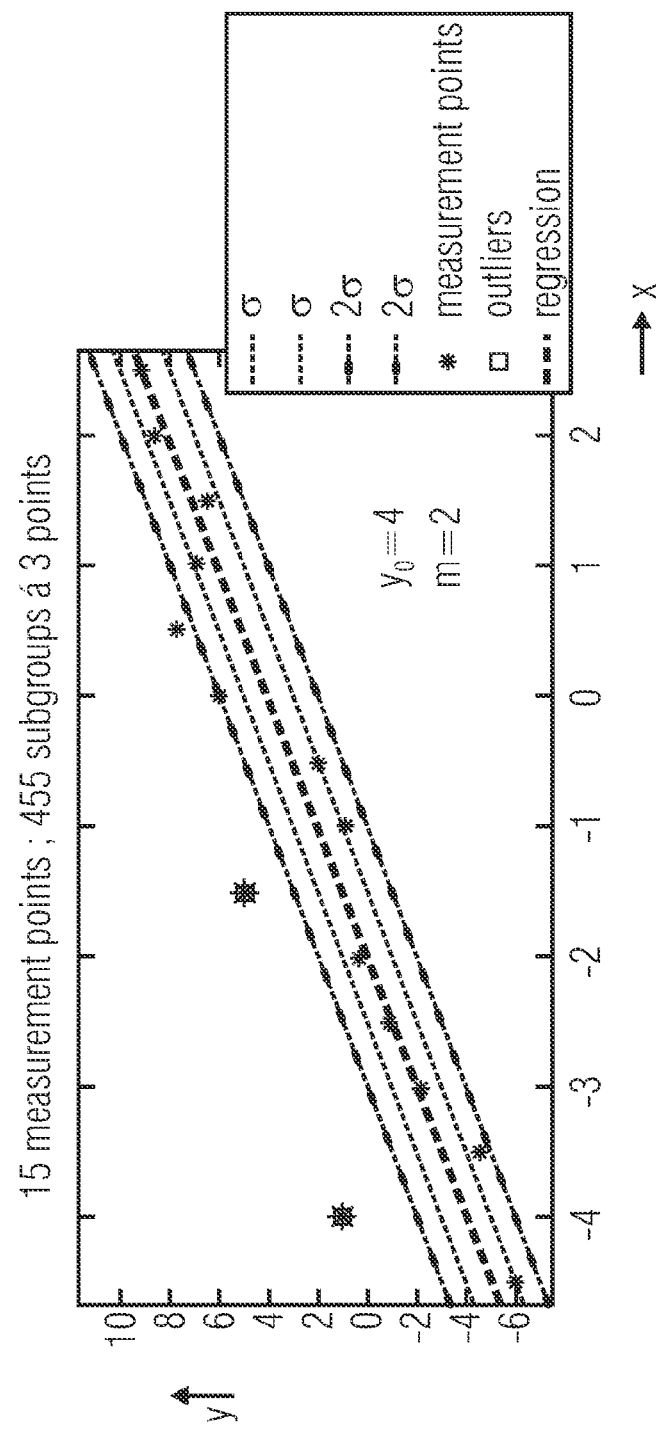
FIGS. 4a-4b show an alternative exemplary illustration for applying the inventive concept for a physical quantity given by a regression line.

FIGS. 4a and 4b show an alternative example of a linear regression. 15 measurement points exist as measurements. In FIG. 4a these measurement points are designated. Further, two measured points containing errors exist.

To approximate a line only two points are necessitated, so that k=2. Thus, 455 subgroups of three points are formed. The test statistics of each subgroup is calculated and from this test statistic then the monitored significance level is calculated.

The result is weighting factors which are to be found in FIG. 4b. Using the same, the solution according to equation (2) may be calculated, as illustrated in FIG. 4a as a dashed line. FIG. 4b thus shows the overall evidences for the individual measurement values, wherein the second measurement value and the seventh measured value have low evidences which indicates that they are, as illustrated in FIGS. 4a at x=−4 and x=−1.5 far apart from the resulting line. As a solution or as measured quantities to be determined, in the example illustrated in FIG. 4a, for the y section the value 4 and for the inclination the value 2 result.

As indicated, also a combined strategy may be executed wherein outliers which have a quality value or an overall evidence below a certain threshold value are sorted out and all others are introduced into the solution in a weighted form.

The present invention is advantageous insofar that it necessitates no fixed threshold value. The result depends only on the statistics of the characteristics of the error and its compliance with other measurements. Measurements do not have to be eliminated but may also be weighted more or less depending on their qualities. In the example of FIG. 4, the eleventh value x=0.5 is less influential than other goods measurement such as the measurement number 15 x=2.5 which is directly on the line.

According to the invention, also large outliers may be designated as being corrupt by means of a threshold value applied to the qualities or overall evidence. In this case, errors which exist but are not large enough are not detected as such but weighted less strongly in the solution whereby the solution is improved.

The inventive concept is also suitable to eliminate (N−k) simultaneously occurring multiple faults and not consider the same in the calculation of the physical quantity.

With respect to conventional approaches, the inventive concept is further advantageous insofar as not necessarily thresholds such as, for example, the thresholds indicated in FIGS. 4a at σ and 2 σ are necessitated. If a small threshold value is selected, together with the measurement containing errors, noisy measurements are also eliminated. A higher threshold value would introduce measurements containing errors into the solution. However, if all or at least most measurements are considered but weighted according to their quality value, better results are achieved.

The present invention may be used in most different applications if measurement outliers are to be identified or if measured values containing errors were introduced in order to draw up a physical quantity. This, for example, relates to satellite navigation or any physical problems in which a linear regression has to be used, wherein the physical quantity to be measured, for example, may also be a position, a distance, a pressure, a temperature, a speed, an acceleration, an area, a volume, an electrical quantity, a magnetic quantity, an optical quantity or a hydraulic quantity.

In the following, with reference to FIG. 5, an implementation of the present invention is regarded in connection with satellite navigation.

Position determination here necessitates a minimum of four measurements. All additional measurements provide a redundancy and allow the detection of measurement errors. Traditional hypothesis test approaches use a fixed threshold value $T_{RF}$ and its associated significance level $\alpha_{RF}$, illustrated in FIG. 1. The threshold value is derived from a desired false alarm probability. If the observed significance level is smaller than the corresponding significance level $\alpha_{RF}$, the hypothesis $H_0$ is rejected. In the other case it is accepted. In the example illustrated in FIG. 1, the value $T_{Ri}$ would lead to accepting a hypothesis while the value $T_{RJ}$ would lead to rejecting the hypothesis. A rejection based on minimizing a wrong detection probability with respect to a fixed significance level may be applied to long lasting repeated sampling situations but not to individual experiments as illustrated in [10].

Regarding the present invention the aim is to take a decision about every individual measurement using the current measurement set, i.e., the number of measured values containing errors, wherein the known approach is not suitable for this purpose.

According to the invention, a subgroup test strategy is executed in which the aim or target is to obtain an overall evidence for each measured value depending on its competition with the remaining measured values. The algorithm consists of three steps illustrated in FIG. 5. The first step consists in a subgroup arrangement, the second step consists in a subgroup check and the third step consists in a decision.

In the subgroup arrangement according to the first step, subgroups are set up by dividing the original set of N individual measurements such as, for example, satellite measurements ($sv_1, sv_2, \ldots, sv_k, \ldots, sv_N$) into groups of at least five measured values in order to guarantee a redundancy. The L resulting subgroups ($S_1, S_2, S_3, \ldots, S_L$) are analyzed independent of each other. L corresponds to the overall number of subgroups and is given as follows.

$$L = \binom{N}{z} = \frac{N!}{(N-z)!z!} \quad (16)$$

Depending on the implementation, also less subgroups may be formed and analyzed. However, it is advantageous to analyze as many subgroups as possible, wherein their number is then given by equation (16) when a subgroup comprises five elements.

Figure 5:
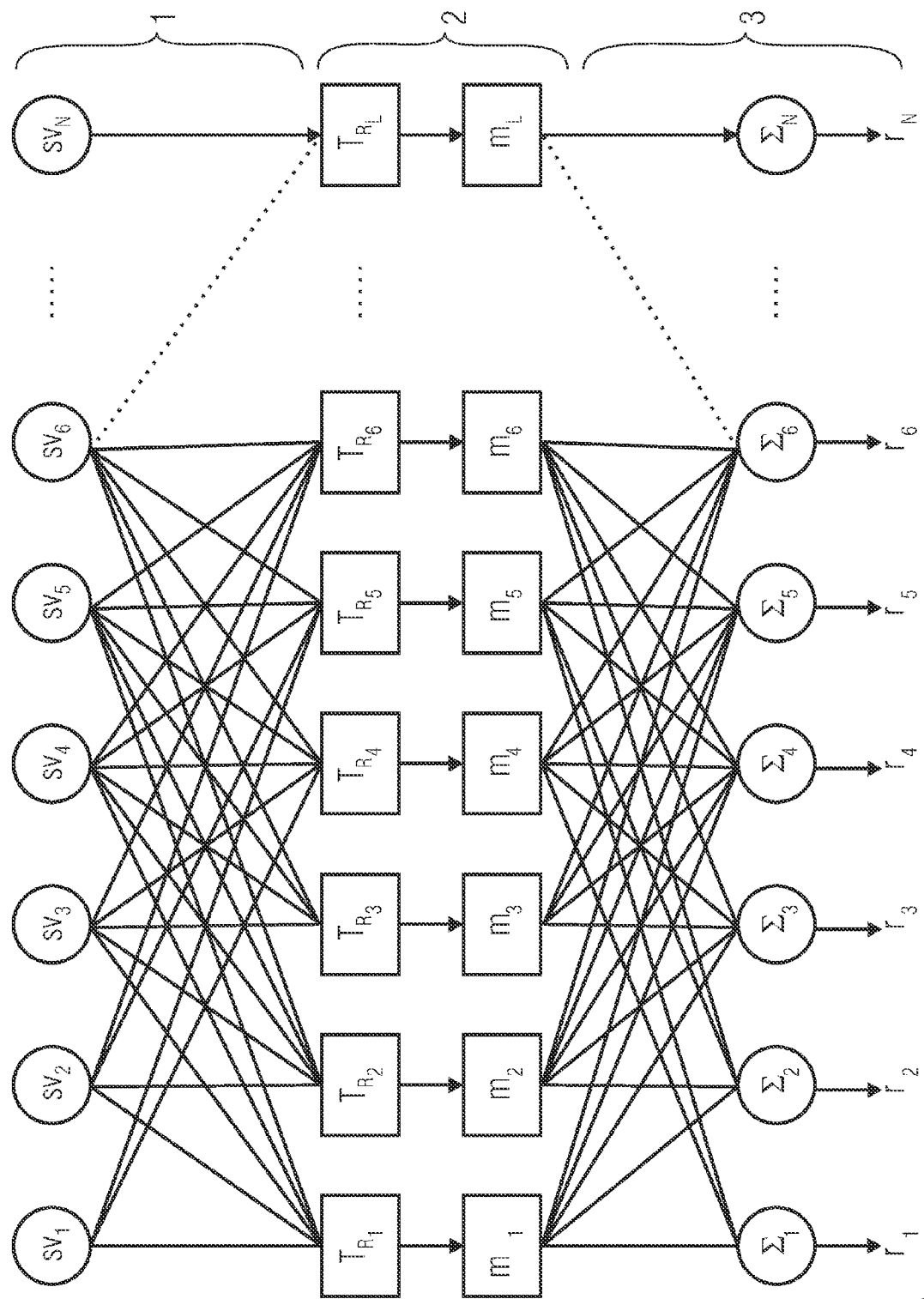
FIG. 5 shows an alternative implementation of the inventive device for determining a physical quantity according to a further embodiment of the present invention.
Figure 6:
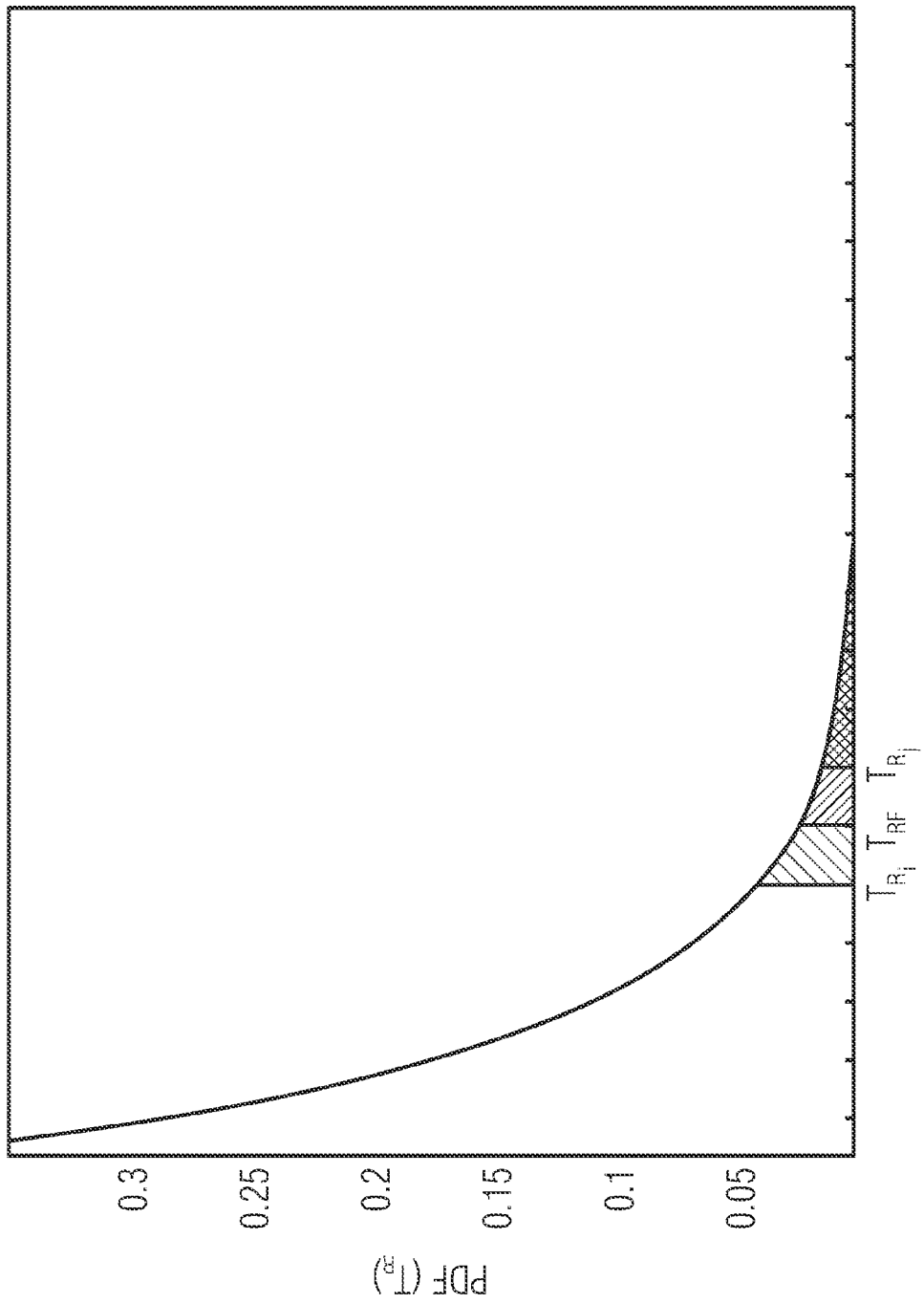
FIG. 6 shows an illustration of a probability distribution (PDF) as a function of test statistics values for different subgroups for calculating the significance level for the individual subgroups.

In the second step in FIG. 5, a subgroup check is executed. For each subgroup ($S_1, S_2, \ldots, S_i, \ldots S_L$) a test statistic value $T_{Ri}$ is calculated based on equation (11). For the obtained value, the observed significance level is determined according to equation (15), i.e., the right-side probability of a central chi-square distribution is calculated. The chi-square distribution is completely described by the degree of freedom which is defined by the redundancy value. In case of subgroups having five measurements, the distribution has one single degree of freedom. If a subgroup had six or more measurements, which may also be the case, the distribution would have two or more degrees of freedom.

As the significance level (m) is a monotonous function which decreases together with the value of the test statistics, it may be taken as a measurement of the evidence of the subgroup that the subgroup contains errors or is error free. This means that a small value indicates that at least one measurement which exists in the current subgroup contains errors or comprises an extraordinarily high noise level. The evidence value or reliability value obtained for the complete subgroup is advantageously allocated to all individual measurements contained in the subgroup.

In a third stage of the algorithm a decision is made. To have an evaluation for each individual measured value, the observed significance levels associated with each subgroup are combined. The proposed strategy is presented with reference to FIG. 6.

It is assumed that the observed significance level for one subgroup $T_{Ri}$ is close to the value for the subgroup $T_{Rj}$. In this case, executing a hard decision, i.e., allocating a reliability value of 1 (inlier) to the subgroup $S_i$ and a reliability value of 0 (outlier) to a subgroup $S_j$ would lead to unwanted results. In this embodiment the present invention consists in calculating the observed significance levels, i.e., for each subgroup. Instead of adding up the counter value of times at which a measurement was in a subgroup containing at least one measured value containing errors, observed significance values according to the invention are added up. This value is subsequently also referred to as quality value ($r_k$) or as overall evidence.

The obtained quality value of a measurement $sv_k$ not only depends on its own error but is strongly dependent also on other measurements or measured values. Thus, this quality value or this overall evidence for a measured value is rather a relative than an absolute statement regarding the measured value. The stronger the error is in the measurement, the smaller the quality value for this measurement is, i.e., for this measured value. This information is used as a weighting factor in position determination or may also be used to exclude measured values containing errors, or both strategies may be used in a combined way.

With respect to a complete example having seven measurements for a linear regression, reference is made to the annex, in which step by step the implementation with reference to numerical examples is explained and in which reference is made to the above described equations.

Although in the above description, certain elements were described as features of a device and certain elements were described as steps of a method, it is noted that both the features of a device likewise represent steps of a method and vice versa. The device is a computer system or a processor or another device consisting of a programmable hardware circuit and which is programmed to implement the invention.

Depending on the determined implementation, the inventive method may also be implemented in hardware or in software. The implementation may be executed using a digital storage medium and in particular the flash storage, a floppy disc, a DVD or CD having electronically readable control signals stored on the same when the storage medium cooperates with a programmable computer system so that the inventive method is executed. In general, the present invention, thus, also consists in a computer program having a program code stored on a machine readable carrier or on a touchable medium wherein the program code is implemented to execute the inventive method when the computer program is executed on a computer or a processor. In other words, the invention is, thus, also a computer program having a program code for executing the inventive method when the computer program is executed on a computer.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

References

[1] G. Schroth; M. Rippl, A. Ene, J. Blanch, B. Belabbas, T. Walter, P. Enge, and M. Meurer, "Enhancements of the Range Consensus Algorithm (RANCO), *Proceedings of the ION GNSS Conference*, 2008.

[2] H. Kuusniemi, "User-level reliability and quality monitoring in satellite-based personal navigation," Ph.D. dissertation, Tampere University of Technology, 2005.

[3] B. Pervan, D. Lawrence, C. Cohen, and B. Parkinson, "Parity space methods for autonomous fault detection and exclusion using GPS carrier hase," in *IEEE 1996 Position Location and Navigation Symposium*, 1996., 1996, pp. 649-656.

[4] Y. Lee, "Receiver autonomous integrity monitoring (RAIM) capability for sole-means GPS navigation in the oceanic phase of flight," *IEEE Aerospace and Electronic Systems Magazine*, vol. 7, no. 5, pp. 29-36, 1992.

[5] I. Nikiforov and B. Roturier, "Statistical analysis of different RAIM schemes," in *ION GPS 2002: 15th International Technical Meeting of the Satellite Division of The Institute of Navigation; Portland, Oreg*. Institute of Navigation, 3975 University Drive, Suite 390, Fairfax, Va., 22030, USA, 2002.

[6] E. Kaplan and C. Hegarty, *Understanding GPS: Principles and Applications Second Edition*, C. J. H. Elliott Kaplan, Ed. Artech House, 2006.

[7] S. M. Kay, *Fundamentals of Statistical Signal Processing: Detection Theory*. Prentice Hall, Upper Saddle River, New Jersey.

[8] J. Gibbons and J. Pratt, "P-values: interpretation and methodology," *The American Statistician*, vol. 29, no. 1, pp. 20-25, 1975.

[9] R. Elston, "On fisher's method of combining p-values," *Biometrical journal*, vol. 33, no. 3, pp. 339-345, 2007.

[10] R. Hubbard and M. Bayarri, "Confusion over measures of evidence (p's) versus errors ($\alpha$'s) in classical statistical testing," *The American Statistician*, vol. 57, no. 3, pp. 171-178, 2003.

[11] G. Schroth, A. Ende, J. Blanch, T. Walter, and P. Enge, "Failure Detection and Exclusion via Range Consensus." In *European Navigation Conference*.

Annex

Linear Regression:
There are N = 7 noisy measurements:
Variances of the noise = var = 1
Two defect measurements (2 and 5) with bias = 4
$y_i$ = [−1.3370 3.1458 0.7987 3.8801 9.9347 8.4853 9.4045]$^T$
For known points $x_i$ = [−3 −2 −1 0 1 2 3]$^T$
Searched are inclination (st) and y axis section (yo); ideal values = [2 4]
0. Liberalization of the system: The system is already linear (Eq. 1)
$Y_i$ = H [st] + e
       [yo]
wherein H = [−3 1]
            [−2 1]
            [−1 1]
            [0 1]
            [1 1]
            [2 1]
            [3 1]

1. Dividing the measurement set: To describe a line k = 2 points are necessitated, the subsets thus have 3 elements. 7!/(4!3!) = 35 subsets result (Eq. 16)
S = 1 2 3
    1 2 4
    1 2 5
    1 2 6
    1 2 7
    1 3 4
    1 3 5
    1 3 6
    1 3 7
    1 4 5
    1 4 6
    1 4 7
    1 5 6
    1 5 7
    1 6 7
    2 3 4
    2 3 5
    2 3 6
    2 3 7
    2 4 5
    2 4 6
    2 4 7
    2 5 6
    2 5 7
    2 6 7
    3 4 5
    3 4 6
    3 4 7
    3 5 6
    3 5 7
    3 6 7
    4 5 6
    4 5 7
    4 6 7
    5 6 7

2. Determination of a matrix (P) orthogonal to H -Parity Space-: A QR factorization is used. (Eq. 3)
For each subset $S_i$ there is a matrix P. As only one redundant element exists, this matrix has a size 1 × 3.
P = [0.4082 −0.8165 0.4082
0.5345 −0.8018 0.2673
0.5883 −0.7845 0.1961
0.6172 −0.7715 0.1543
0.6350 −0.7620 0.1270
0.2673 −0.8018 0.5345
0.4082 −0.8165 0.4082
0.4867 −0.8111 0.3244
0.5345 −0.8018 0.2673
0.1961 −0.7845 0.5883
0.3244 −0.8111 0.4867
0.4082 −0.8165 0.4082
0.1543 −0.7715 0.6172
0.2673 −0.8018 0.5345
0.1270 −0.7620 0.6350
0.4082 −0.8165 0.4082
0.5345 −0.8018 0.2673
0.5883 −0.7845 0.1961
0.6172 −0.7715 0.1543
0.2673 −0.8018 0.5345
0.4082 −0.8165 0.4082
0.4867 −0.8111 0.3244
0.1961 −0.7845 0.5883
0.3244 −0.8111 0.4867
0.1543 −0.7715 0.6172
0.4082 −0.8165 0.4082
0.5345 −0.8018 0.2673
0.5883 −0.7845 0.1961
0.2673 −0.8018 0.5345
0.4082 −0.8165 0.4082
0.1961 −0.7845 0.5883
0.4082 −0.8165 0.4082
−0.5345 0.8018 −0.2673
0.2673 −0.8018 0.5345
0.4082 −0.8165 0.4082]

3. Calculating the test statistics for each subset: (by means of Rao test), all measurements have the same variance (eq. 11 −> 13)
TR = |P*y|^2/var
TR = [7.7746 4.8395 1.7057 3.7750 4.2095 1.1585 8.1675
2.1156 1.3420 6.4467 0.3009 0.0157 6.9372 10.8629
0.4405 4.9115 13.6626 8.3428 7.7094 9.2419 2.4972
2.0592 4.7706 6.0547 0.0658 1.4733 0.1733 0.5322
10.3455 15.5726 0.9344 9.3850 11.4109 0.5468 0.9351]

4. Calculating the observed significance level: Integral below the curve for the chi-square distribution with 1 degree of freedom -right-tail probability- (eq. 15)
m(p) = [0.0053 0.0278 0.1915 0.0520 0.0402 0.2818 0.0043
0.1458 0.2467 0.0111 0.5833 0.9003 0.0084 0.0010
0.5069 0.0267 0.0002 0.0039 0.0055 0.0024 0.1140
0.1513 0.0289 0.0139 0.7976 0.2248 0.6772 0.4657
0.0013 0.0001 0.3337 0.0022 0.0007 0.4596 0.3335]

5. Evidence allocation

| Measurement | set 1 | 2 | 3 | 4 | 5 | 6 | 7 |
|---|---|---|---|---|---|---|---|
| $S_1$ | 0.0053 | 0.0053 | 0.0053 | | | | |
| $S_2$ | 0.0278 | 0.0278 | | 0.0278 | | | |
| $S_3$ | 0.1915 | 0.1915 | | | 0.1915 | | |
| $S_4$ | 0.0520 | 0.0520 | | | | 0.0520 | |
| $S_5$ | 0.0402 | 0.0402 | | | | | 0.0402 |
| $S_6$ | 0.2818 | | 0.2818 | 0.2818 | | | |
| $S_7$ | 0.0043 | | 0.0043 | | 0.0043 | | |
| $S_8$ | 0.1458 | | 0.1458 | | | 0.1458 | |
| $S_9$ | 0.2467 | | 0.2467 | | | | 0.2467 |
| $S_{10}$ | 0.0111 | | | 0.0111 | 0.0111 | | |
| $S_{11}$ | 0.5833 | | | 0.5833 | | 0.5833 | |
| $S_{12}$ | 0.9003 | | | 0.9003 | | | 0.9003 |
| $S_{13}$ | 0.0084 | | | | 0.0084 | 0.0084 | |
| $S_{14}$ | 0.0010 | | | | 0.0010 | | 0.0010 |
| $S_{15}$ | 0.5069 | | | | | 0.5069 | 0.5069 |
| $S_{16}$ | | 0.0267 | 0.0267 | 0.0267 | | | |
| $S_{17}$ | | 0.0002 | 0.0002 | | 0.0002 | | |
| $S_{18}$ | | 0.0039 | 0.0039 | | | 0.0039 | |
| $S_{19}$ | | 0.0055 | 0.0055 | | | | 0.0055 |
| $S_{20}$ | | 0.0024 | | 0.0024 | 0.0024 | | |
| $S_{21}$ | | 0.1140 | | 0.1140 | | 0.1140 | |
| $S_{22}$ | | 0.1513 | | 0.1513 | | | 0.1513 |
| $S_{23}$ | | 0.0289 | | | 0.0289 | 0.0289 | |
| $S_{24}$ | | 0.0139 | | | 0.0139 | | 0.0139 |
| $S_{25}$ | | 0.7976 | | | | 0.7976 | 0.7976 |
| $S_{26}$ | | | 0.2248 | 0.2248 | 0.2248 | | |
| $S_{27}$ | | | 0.6772 | 0.6772 | | 0.6772 | |
| $S_{28}$ | | | 0.4657 | 0.4657 | | | 0.4657 |
| $S_{29}$ | | | 0.0013 | | 0.0013 | 0.0013 | |
| $S_{30}$ | | | 0.0001 | | 0.0001 | | 0.0001 |
| $S_{31}$ | | | 0.3337 | | | 0.3337 | 0.3337 |
| $S_{32}$ | | | | 0.0022 | 0.0022 | 0.0022 | |
| $S_{33}$ | | | | 0.0007 | 0.0007 | | 0.0007 |
| $S_{34}$ | | | | 0.4596 | | 0.4596 | 0.4596 |
| $S_{35}$ | | | | | 0.3335 | 0.3335 | 0.3335 |

Annex

6. Overall evidence (Mi)

| measurement | 1 | 2 | 3 | 4 | 5 | 6 | 7 |
|---|---|---|---|---|---|---|---|
| Mi | 3.0063 | 1.4612 | 2.4229 | 3.9288 | 0.8244 | 4.0484 | 4.2567 |

7. When applying WLS (Eq. 2; Paper Plans2010) X_hat = [st yo]
Without error identification
Xls_hat = [1.9474
5.3846]
Without discarding or excluding measurements but using Mi as weighting factor
Xrao_hat without exclusion = [1.8311
4.3569]
All measurements with normalized Mi below a certain threshold (e.g. 0.5) are discarded or excluded and the remaining measurements weighted with Mi.
Normalized Mi:

| Measurement | 1 | 2 | 3 | 4 | 5 | 6 | 7 |
|---|---|---|---|---|---|---|---|
| Mi/max (Mi) | 0.7063 | 0.3433 | 0.5692 | 0.9230 | 0.1937 | 0.9511 | 1.0000 |

Xrao_hat with exclusion = [1.9278
3.9276]

The invention claimed is:

1. A device for determining a physical quantity from a number of measured values comprising errors, wherein the physical quantity is defined by a measured quantity or a plurality of measured quantities, and wherein the number of the measured values is higher than the number of the measured quantities, comprising:
   a grouper for grouping the number of measured values comprising errors into a plurality of subgroups of measured values, wherein each subgroup comprises a redundancy, so that each subgroup includes a number of measured values, the number of measured values being greater than a number of measured quantities;
   a calculator for calculating a reliability quantity for each subgroup based on the redundancy comprised in the subgroup;
   an individual allocator for allocating individual evidence quantities to the measured values comprising errors of each subgroup based on the reliability quantity for the respective subgroups, so that a respective measured value has a plurality of individual evidence quantities allocated thereto;
   an evidence determiner for determining one overall evidence each for the measured values comprising errors based on the plurality of individual evidence quantities for the respective measured value; and
   a processor for calculating the physical quantity using at least some of the measured values comprising errors and at least some of the overall evidences.

2. The device according to claim 1, wherein the physical quantity is presentable by a linear or linearizable model in a coordinate system and the measured values are coordinate points in the coordinate system, or
   wherein the physical quantity is a position and the measured values are based on distances between the position and a plurality of satellites.

3. The device according to claim 1, wherein the measured values comprising errors comprise geometry information and redundancy information,
   wherein the calculator is implemented to calculate parity information by which the measured values comprising errors are transformable into parity values in which the influence of the geometry is reduced or eliminated, and
   wherein the calculator is further implemented to use the parity information or the parity values in the calculation of the reliability quantities.

4. The device according to claim 3, wherein the parity information comprise a parity matrix P which is orthogonal to a measurement matrix and may be derived by a QR factorization (into an orthogonal matrix Q and an upper triangular matrix R) or SVD (Singular Value Decomposition) factorization of the measurement matrix, wherein the measurement matrix represents a relation between the physical quantity and the measured values comprising errors.

5. The device according to claim 1,
   wherein the calculator is implemented to calculate for each subgroup a test statistics value using a statistics test and to use the test statistics value in the calculation of the reliability quantity.

6. The device according to claim 5, wherein the calculator is implemented to use the GLR (Generalized Likelihood Ratio) test or the Rao test in the calculation of the test statistics value.

7. The device according to claim 6,
   wherein the calculator is implemented to calculate a significance level as a reliability quantity using the test statistics and a statistical distribution which depends on a redundancy.

8. The device according to claim 7, wherein the calculator is implemented to calculate the significance level of a subgroup by an integral of the statistical distribution based on the test statistics for the subgroup.

9. The device according to claim 1,
   wherein the calculator is implemented to calculate the reliability quantity for each subgroup using a statistical distribution which depends on the redundancy of the subgroup.

10. The device according to claim 1,
    wherein the allocator is implemented to allocate the same individual evidence quantity to each measured value comprising errors of a subgroup, wherein the quantity is equal to the reliability quantity for the subgroup, or
    to allocate different individual evidence quantities to measured values comprising errors of a subgroup, wherein the quantities depend on the reliability quantity for the subgroup, wherein an individual evidence quantity determined via a subgroup deviates by no more than 50% from the reliability quantity.

11. The device according to claim 1,
    wherein the evidence determiner is implemented to sum up for each measured value comprising errors the individual evidence quantities for the measured value, to form an average value from the individual evidence quantities, to select the highest or second highest individual evidence value or to evaluate the individual evidence values together in order to acquire the overall evidence for a measured value comprising errors.

12. The device according to claim 1,
    wherein the processor is implemented to determine, based on the overall evidence, a weighting factor for the measured value comprising errors, wherein the measured value comprising errors is introduced into to the calculation of the physical quantity weighted with the same, or wherein the processor is implemented to use, based on the overall evidence for a measured value comprising errors, this measured value in the calculation of the physical quantity or not.

13. The device according to claim 12, wherein the processor is implemented to execute the physical quantity using a method according to the weighted least squares, a Kalman filter or another estimation method in which a measurement matrix and the measured values comprising errors are used, wherein the measurement matrix represents a connection between the physical quantity and the measured values comprising errors.

14. The device according to claim 1, wherein the processor is implemented to identify one or several measured value outliers using the overall evidences for the measured values comprising errors.

15. The device according to claim 1, wherein the physical quantity is a position, a distance, a pressure, a temperature, a speed, an acceleration, an area, a volume, an electrical quantity, a magnetic quantity, an optical quantity or a hydraulic quantity.

16. The device according to claim 1:

a linearizer for linearizing a non-linear connection between the measured quantities and the measured values comprising errors.

17. A method for determining a physical quantity from a plurality of measured values comprising errors, wherein the physical quantity is defined by a measured quantity or a plurality of measured quantities, and wherein the number of measured values is higher than the number of measured quantities, comprising:

grouping the number of measured values comprising errors into a plurality of subgroups of measured values, wherein each subgroup comprises a redundancy, so that each subgroup includes a number of measured values, the number of measured values being greater than a number of measured quantities;

calculating a reliability quantity for each subgroup based on the redundancy comprised in the subgroup;

allocating individual evidence quantities to the measured values comprising errors of each subgroup based on the reliability quantity for the respective subgroup, so that a respective measured value has a plurality of individual evidence quantities allocated thereto;

determining one overall evidence each for the measured values comprising errors based on the plurality of individual evidence quantities for the respective measured value; and calculating the physical quantity using at least some of the measured values comprising errors and at least some of the overall evidences.

18. A non-transitory computer readable medium including a computer program for executing, when the program is executed on a computer, the method for determining a physical quantity from a plurality of measured values comprising errors, wherein the physical quantity is defined by a measured quantity or a plurality of measured quantities, and wherein the number of measured values is higher than the number of measured quantities, the method comprising:

grouping the number of measured values comprising errors into a plurality of subgroups of measured values, wherein each subgroup comprises a redundancy, so that each subgroup includes a number of measured values, the number of measured values being greater than a number of measured quantities;

calculating a reliability quantity for each subgroup based on the redundancy comprised in the subgroup;

allocating individual evidence quantities to the measured values comprising errors of each subgroup based on the reliability quantity for the respective subgroup, so that a respective measured value has a plurality of individual evidence quantities allocated thereto;

determining one overall evidence each for the measured values comprising errors based on the plurality of individual evidence quantities for the respective measured value; and calculating the physical quantity using at least some of the measured values comprising errors and at least some of the overall evidences.

* * * * *